March 22, 1960    W. T. HARVEY ET AL    2,929,288
PANTOGRAPH ATTACHMENT FOR LATHES AND THE LIKE
Filed April 8, 1957    4 Sheets-Sheet 1

Wirt T. Harvey,
Charles F. Sardou, Jr.,
Delbert R. Bass,
INVENTORS.

By Bacheler & Lewis

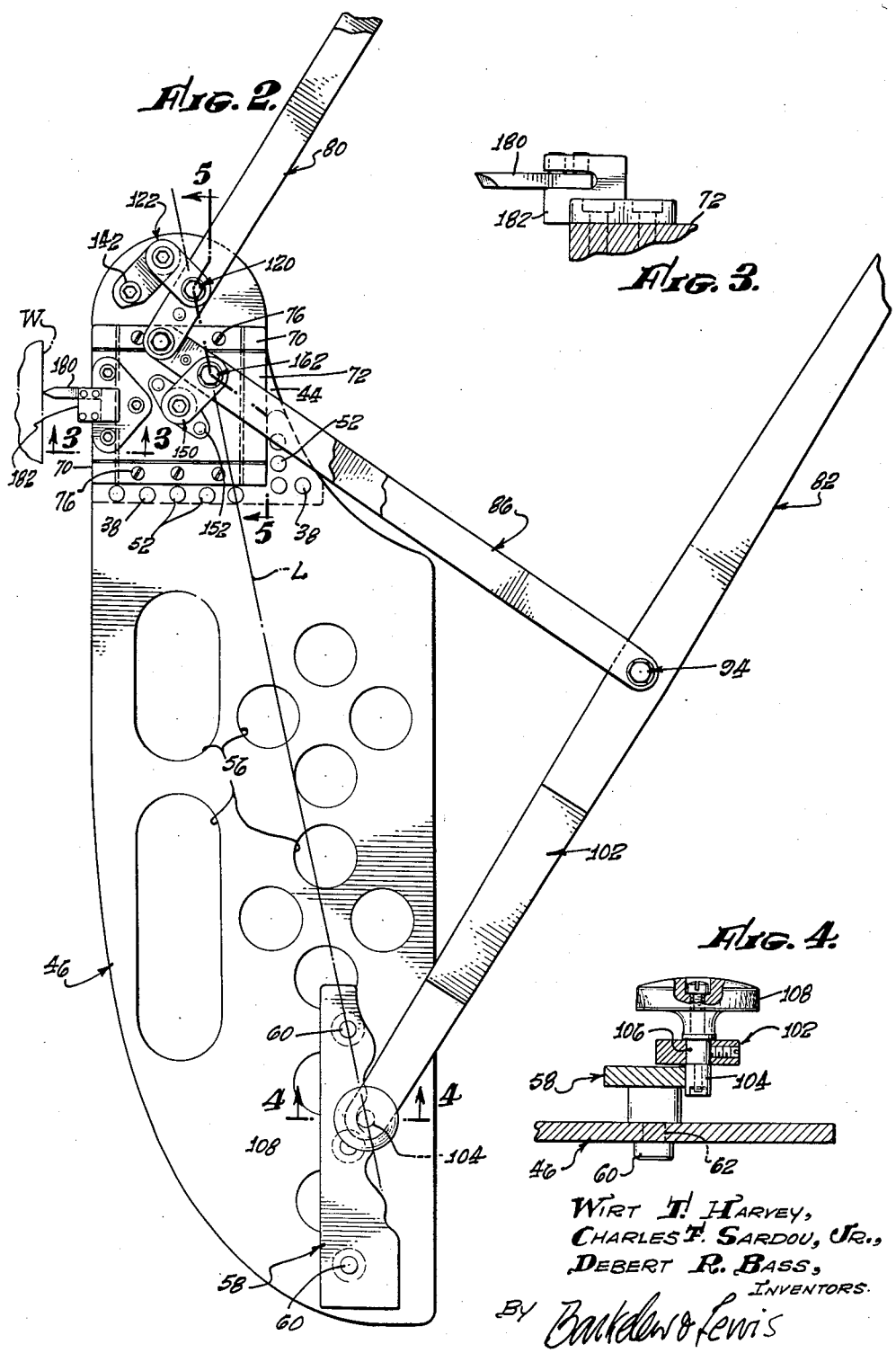

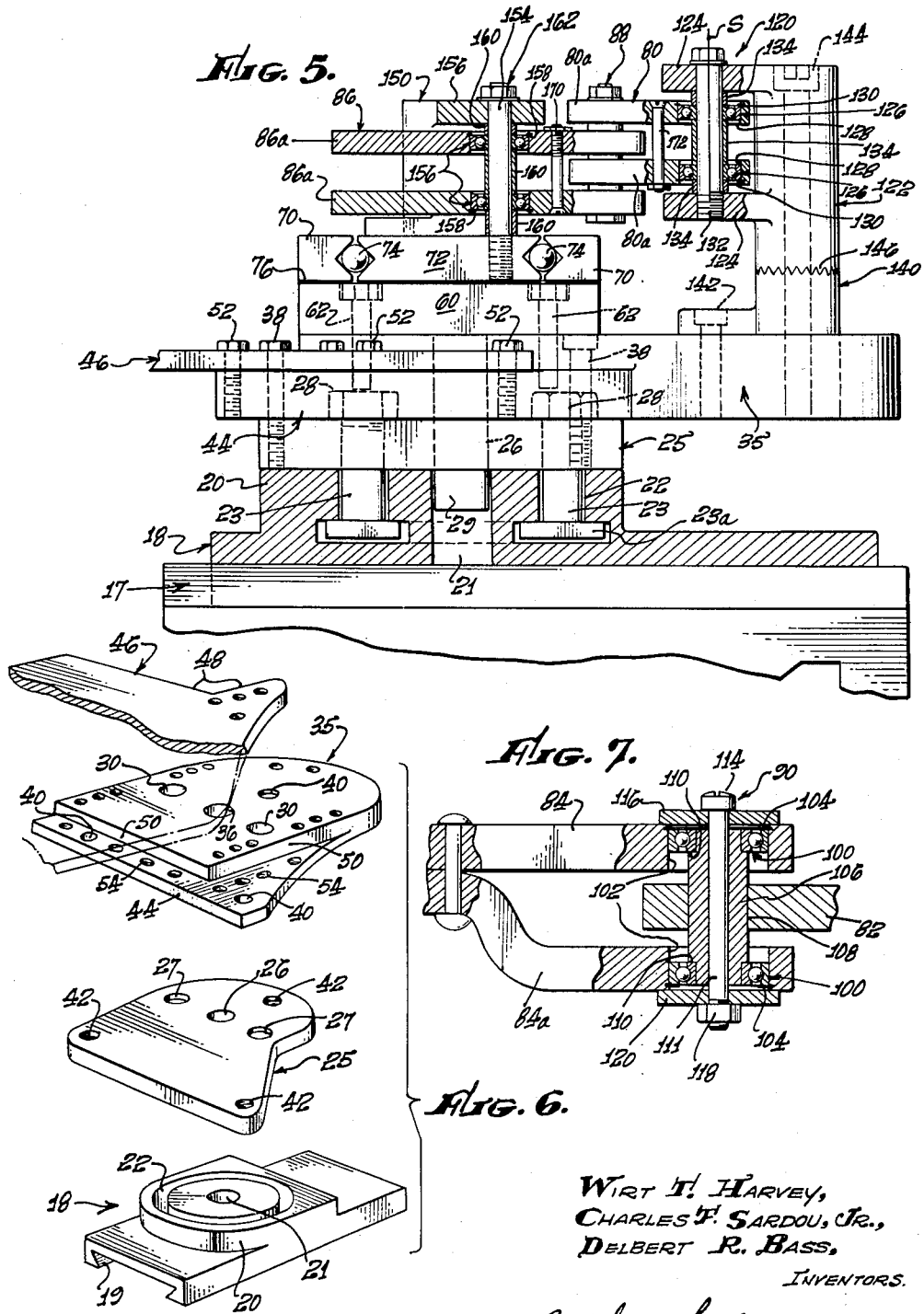

March 22, 1960 W. T. HARVEY ET AL 2,929,288
PANTOGRAPH ATTACHMENT FOR LATHES AND THE LIKE
Filed April 8, 1957 4 Sheets-Sheet 4

WIRT T. HARVEY,
CHARLES F. SARDOU, JR.,
DELBERT R. BASS,
INVENTORS.

BY
Bakelew & Lewis

United States Patent Office 2,929,288
Patented Mar. 22, 1960

2,929,288

PANTOGRAPH ATTACHMENT FOR LATHES AND THE LIKE

Wirt T. Harvey, Altadena, Charles F. Sardou, Jr., Downey, and Delbert R. Bass, Pasadena, Calif., assignors to Giannini Controls Corporation, a corporation of New York Application April 8, 1957, Serial No. 651,258

3 Claims. (Cl. 82—14)

The present invention relates to a new and novel pantograph attachment for lathes and the like and more particularly to a pantograph attachment adapted to be utilized with either a turning, milling or grinding machine.

Although the present invention may be employed in many applications with various types of machines, it is especially adapted for use with lathes in instances where high accuracy is desired, as for example when cutting dies for capsule diaphragms or the like. The utilization of pantograph attachments for lathes and the like is well known in the art whereby rather small work pieces may be reproduced on a diminished scale from an enlarged template, thereby reducing errors in machining to a minimum.

Numerous pantograph attachments have been designed for use with lathes and the like, but such prior art devices have proved to be unsatisfactory to such an extent that virtually all machine operations of the special type performed by the present invention are presently performed by special pantograph machines thereby necessitating a much greater investment in machinery to equal the versatility of a lathe or the like incorporating a pantograph attachment according to the present invention.

Prior art pantograph attachments suffer from a number of inherent disadvantages which prevent their practical utilization when it is desired to accurately machine small work pieces. Prior art pantograph devices are fixedly supported in position on some portion of the frame of a lathe or the like. Accordingly, the initial position of the tool actuated by the pantograph attachment is difficult to adjust with the desired degree of accuracy, since it is often necessary to unfasten the entire attachment and refasten it in a new position on the frame in order to properly position the device. This is obviously an inaccurate method of adjustment since the pantograph attachment is difficult to fasten to the frame with a great deal of accuracy.

In addition, many of the known devices have a portion connected to the tool-carrying cross-slide of the lathe and the like to actuate the lathe cross-slide and carriage by the pantograph mechanism, thereby necessitating considerable effort by the operator, and setting up distorting stresses on the pantograph linkage. The friction involved in such a system is excessive. Extreme accuracy in the work is difficult if not impossible to attain.

Furthermore, the pantograph linkages utilized in known devices are insufficiently rigid and have an excess amount of lost motion therein which prevents the attainment of very accurate results. The pantograph linkages of prior art systems also employ construction whereby the back-lash present in the over-all system including the pantograph linkage and the associated holding means introduces serious errors in the machining of the work piece.

The present invention provides an arrangement wherein the entire pantograph linkage and its associated ball bearing mounted holding means for the tool or the work, is entirely supported by the cross-slide of a conventional lathe, for example. In this manner, accuracy of initial positioning adjustment is attained, the friction of the over-all system is reduced to a minimum and at the same time maximum rigidity is attained in order to obtain the desired accuracy of results. The pantograph linkage of the present invention employs a plurality of spaced arms incorporating pairs of ball bearing assemblies at their various pivot points whereby the pivotal connections between the arms and components connected thereto are extremely rigid and reduce lost motion in the system to a minimum. Means is also provided for preloading the pivotal bearings of the pantograph linkage whereby back-lash in the system is substantially eliminated. Accordingly, machine operations may be accomplished on a lathe or the like with an accuracy heretofore unobtainable with prior art devices, thereby solving a long felt need in the art.

An object of the present invention is to provide a new and novel pantograph attachment for lathes and the like wherein the initial relative position of the tool and work may be accurately, quickly and easily adjusted.

Another object of the invention is to provide a pantograph attachment wherein the friction of the system is reduced to a minimum, yet maximum rigidity is attained.

A further object of the invention is the provision of a pantograph attachment wherein lost motion in the system is reduced to a minimum.

Yet another object is to provide a pantograph attachment wherein the back-lash in the pantograph linkage is substantially eliminated.

Still a further object is the provision of a pantograph attachment which is simple and inexpensive in construction, yet sturdy and sensitive in operation.

Other objects and many of the attendant advantages of this invention will be readily appreciated as the same becomes better understood by reference to the following detailed description of a present preferred form of the invention, when considered in connection with the accompanying drawings wherein:

Fig. 2 is a plan of the attachment as shown in Fig. 1;

Figure 1:
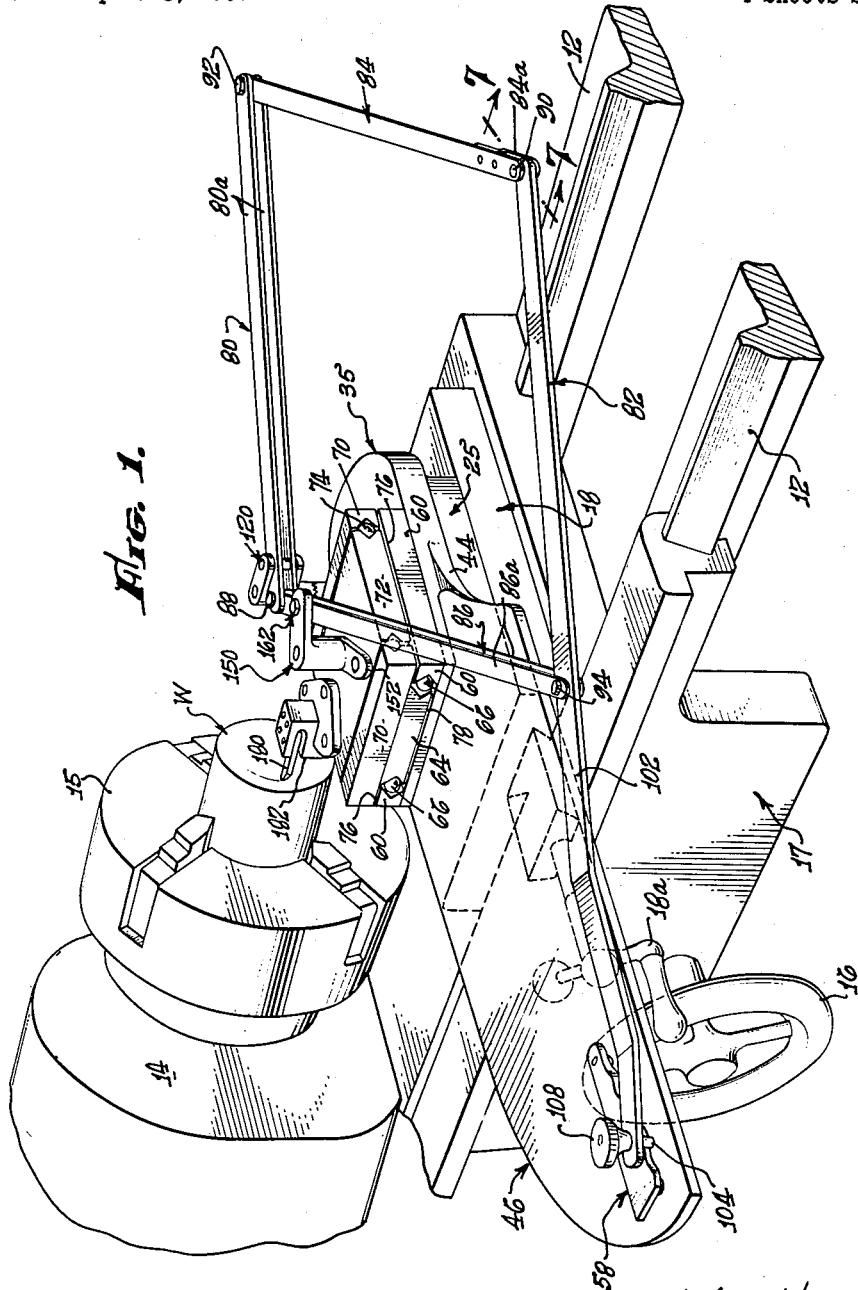
Fig. 1 is a schematic perspective illustrating a present preferred form of the pantographic attachment mounted on a typical lathe, with the work carried by the lathe head-stock and the tool actuated by the pantograph.
Figure 5A:
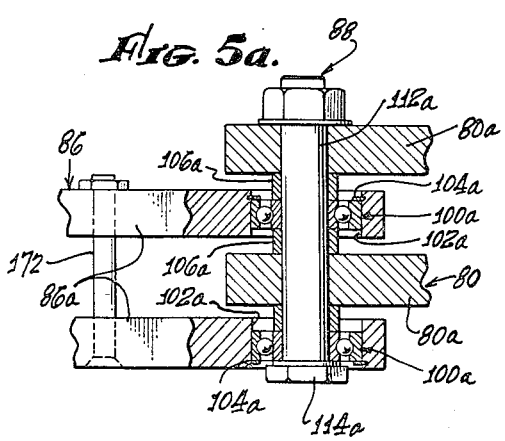

Figs. 3 and 4 are detail sections on lines 3—3 and 4—4, respectively, of Fig. 2;

Fig. 5 is a section on line 5—5 of Fig. 2, showing certain parts in elevation;

Fig. 5a is a section, enlarged, of the structure at inter-link pivot 88, this section being taken in the same aspect as that of Fig. 5;

Fig. 6 is an exploded view of the cross-slide and the mounting members that are directly carried on it;

Fig. 7 is a detail section on line 7—7 of Fig. 1; and

Figure 8:
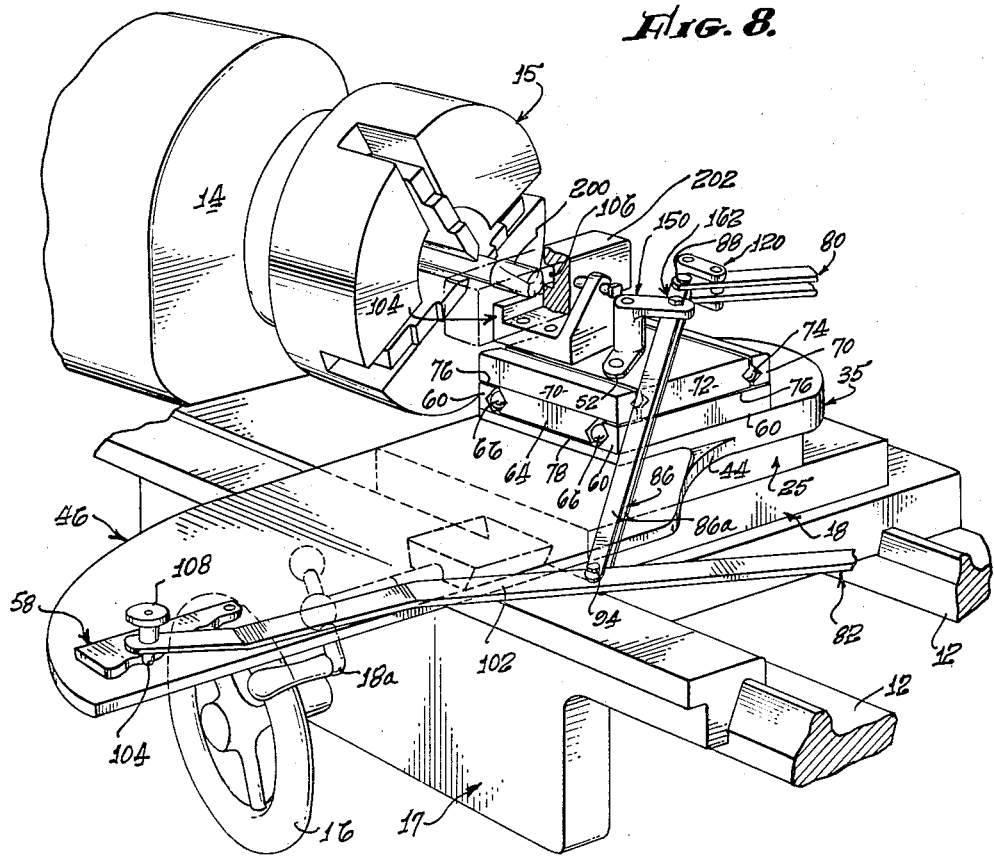

Fig. 8 is a fragmentary schematic perspective illustrating a modified use of the invention, wherein the tool is carried by the head-stock of the lathe and the work is moved relative to the tool by the pantograph.

As pointed out previously, the present invention is equally adapted for use with turning machines, milling machines or grinding machines, but the device as illustrated is shown as employed in conjunction with a lathe for the purposes of illustration.

Referring now to the drawings, there is shown in Fig. 1 in simplified form a lathe having the usual ways 12, and a head-stock illustrated schematically at 14. A chuck, such as 15, illustrates any conventional means of supporting a typical work piece W on the head-stock spindle (not shown). Conventional carriage assembly 17 is slidably mounted on the lathe ways and conventional driving means such as a hand wheel, and associated rack and pinion (not shown) provide for actuating and positioning the carriage longitudinally on the ways. A conventional cross-slide assembly 18 is slidably mounted on carriage 17 and conventional means such as a hand wheel 18a, and associated screw (not shown), provide for actuating and positioning the cross-slide transversely with respect to the lathe ways. The carriage and cross-slide may be held in any set position by their moving means, or by the means (not shown) usually provided for holding them securely and rigidly in any set position. Cross-slide 18 has the usual dovetailed ways 19 and an upstanding boss 20 with the usual central centering hole 21 and a concentric circular undercut slot 22. (See Figs. 5 and 6.)

The mounting parts which are directly mounted on the cross-slide and carry the relatively movable parts of the pantograph are best shown in Figs. 1, 5 and 6. A back-up plate 25 rests directly on the cross-slide and has a central hole 26 registering with central opening 21 of the cross-slide. A centering pin 29 (Fig. 5) extends through openings 21 and 26; and bolts 23, with heads 23a in slot 22 and extending through holes 27 in plate 25, are set by nuts 28 on their upper ends to rigidly set plate 25 in any desired horizontally rotated position. The nuts are accommodated in clearance openings 30 in the base plate 35 that is mounted immediately on back-up plate 25. The arrangement is essentially the same as commonly used for setting a compound slide in any desired horizontal orientation. Fig. 5 merely shows the holding bolts schematically.

Base plate 35 is carried rigidly on back-up plate 25, centering pin 29 extending also through the central opening 36 in the base plate. The base plate is rigidly held on the back-up plate by cap screws, such as indicated at 38 in Fig. 5, that pass through openings 40 in the base plate and thread into registering threaded openings 42 in the back-up plate.

Base plate 35 has a flange formation 44 extending from two of its peripheral edges, and the template carrier plate 46 is rigidly mounted on that flange. The edges 48 of the carrier plate engage edge surfaces 50 of the base plate, and cap screws such as shown at 52, threading into openings such as shown at 54 in the flange 44, hold the template carrier in position. The template carrier is thus held with extreme rigidity in its position on the base plate. The centering dowel pin 29 is press fitted in the base plate and fits snugly in the back-up plate and opening 21 in the cross-slide. When the back-up plate is set up with its holding bolts 23, the base plate 35 and carrier plate 46 are then held rigidly with relation to the cross-slide; and their position and orientation with relation to the work may then be accurately and positively set by the set orientation of the base plate and the settings of the carriage and cross-slide of the lathe.

Template carrier plate 46 may be of any desired form and extent in its portion which extends from its mounting on the base plate. A typical form is shown in Figs. 1 and 2, where the plate is shown (Fig. 2) wtih weight-lightening holes 56 which may also be used to facilitate the clamping of templates to the plate. A typical template is shown at 58, secured rigidly to the plate by bolts, cap screws or dowel pins 60 which extend through holes 62 that may be bored through the plate especially for any particular template (see Fig. 4).

Base plate 35 carries a pair of opposed parallel guide rails 60, rigidly secured to the plate as by the recessed cap screws indicated at 62 in Fig. 5. These guide rails are V-grooved on their opposing faces as shown in Fig. 1. A lower slide 64, between the rails 60, has V-grooves in its edges opposing the grooves of the rails, and ball bearing assemblies (with cages, not shown) 66 are confined snugly between the opposed V-formations to form ball bearing supports and guides for the lower slider. Adjustment of the rails 60, either bodily or by adjustable liner, to keep the balls snugly confined and avoid any looseness between the rails and slider, or to pre-load the balls, may be accomplished in any suitable known manner and is not necessary to show here.

Lower slider 64, which may be termed a sub-slider, in turn carries a second set of V-grooved guide rails 70 between which a second, upper carrier slider 72 is guided snugly by interposed ball bearing assemblies 74. The upper rails are rigidly held on the lower slider, as by the cap screws 76 indicated in Fig. 2, and may be adjustable in the same maner as the lower rails to set the ball bearings up snugly or to pre-load them. The upper rails slightly clear the lower rails and the upper slider slightly clears both the lower rails and slider (as indicated at 76 in Figs. 1 and 5), and the lower slider slightly clears the upper surface of base plate 35 (as indicated in Fig. 1 at 78), to allow both sliders frictionless freedom of movement in their guided directions. The direction of the upper rails and upper slider movement is transverse of the lower rails and lower slider movement, preferably at right angles thereto as shown in the drawings.

The pantograph linkage, as shown in the drawings, is made up of four links 80, 82, 84, and 86 interconnected at pivots 88, 90, 92, and 94 to form a parallelogram. The inter-pivotal lengths of all four arms may be equal; at least the lengths of the opposed pairs 80, 82 and 84, 86 are accurately equal. Link 82 has an extension 102 carrying the template follower or stylus 104, preferably shown here in the form of a roller (Fig. 4) mounted on the lower end of a pin 106 set in arm 102 and carrying a knob-handle 108 above, the knob serving as convenient manual control means for moving the stylus roller along the contoured length of the template.

As here shown, links 80 and 86 are double, involving upper and lower spaced link bars 80a and 86a. See Figs. 1 and 5. At the pivot 90, between the two single-bar links 82 and 84, one of those links, say 84, has a rigidly attached bar part 84a spaced below 84 so that link 82 is received between 84 and 84a. Fig. 7 is an enlarged section showing the pivot construction at 90. The outer races of ball bearings 100 are pressed into openings 102 in the ends of link bar 84 and sub-bar 84a and held in place by snap rings 104. The inner races of the bearings are press-fitted on the reduced ends of a spacer sleeve 106 that is press-fitted into opening 108 in the end of link 82. The inner races bear against shoulders 110 of the sleeve. A bolt 112 extends through sleeve 106, its head 114 bearing on a washer 116 and its nut 118 bearing on a washer 120. Washers 116 and 120 bear on the outer faces of link bar 84 and sub-bar 84a. By setting up nut 118 and thus forcing 84 and 84a, and the outer bearing races, toward each other, the ball bearings are pre-loaded to eliminate any give or looseness in them.

The pivot structures at 92 and 94 are the same as at 90. Fig. 7 may be taken as specifically illustrating those other two pivot structures by taking 84 in Fig. 7 to be the upper link bar 80a or 86a, and 84a in Fig. 7 to be the lower link bar 80a or 86a, and link 82 in that figure to be 82 at pivot 94 or 84 at pivot 92.

The structure of the linkage pivot 88, between the two double barred links 80 and 86, is shown in Fig. 5a. As shown there, the ball bearings 100a have their outer races press-fitted into openings in one of the set of link bars, as the openings 102a in bars 86a. The outer races are held in place by snap rings 104a. Sleeves 106a bear endwise between link bars 80a and the inner bearing races. Bolt 112a, press-fitted or closely fitted through the link bars 80a and the inner bearing races, has its nut 118a bearing on the outer face of upper link bar 80a, and its head 114a bearing on the inner race of lower bearing 100a. The pre-loading of this bearing structure is described later.

Referring now more particularly to Figs. 1, 2 and 5, the numeral 120 designates generally a supporting pivot structure for the pantograph linkage on base plate 35. This pivot structure, as best shown in Fig. 5, comprises a supporting post 122 with vertically spaced ears or lugs 124 that receive between them the two bars 80a of link 80. Ball bearings 126 have their outer races press-fitted into openings 128 in the bars, and are held in place by snap rings 130. A bolt, or cap screw, 132 extends vertically between the post ears 124 and is tightly fitted to them. The bolt forms the pivot pin and extends in close fit through the inner bearing races; and those races are spaced from each other and the post ears by spacer sleeves 134. The distance of axis S of this pivot structure from the axis of inter-link pivot 88 is a factor in determining the reduction ratio of the pantograph linkage, as will be seen.

The position of the supporting pivot axis S with relation to base plate 35, and the cross-slide, may be adjustably changed by swinging post 122 about its vertical axis. The post is mounted on a mounting foot 140 that is secured to base plate 35 by cap screws indicated at 142. A bolt or cap screw 144 holds the post down on the foot, and the post may be set with its pivot-carrying ears in various positions by swinging it about its axis and then setting it down with its serrated lower end engaging the corresponding serrated upper surface of the foot, indicated at 146.

A pivot bracket 150 is set on upper slide 72, held rigidly on the slide by set screws or equivalent, indicated in Figs. 1 and 2 at 152. A pivot pin 154 (Fig. 5) fits tightly through a projecting lug 156 at the upper end of the bracket and projects down and is set in upper slide 72. A pair of ball bearings 156 have their inner races fitted tightly on the pin and their outer races fitted tightly in openings through the two bars 86a of pantograph link 86. The outer races are held in place in the link bars by snap rings 158; and the inner races are spaced from each other, and from bracket ear 156 and the upper surface of slider 72, by spacer sleeves 160. The whole forms the pivot structure generally designated 162 whose axis is rigidly set on to the upper slider.

The two bolts shown at 170 and 172 provide the means for pre-loading the ball bearings of all three pivots 88, 120, and 162. Bolt 170 extends between bars 86a of the link 86, and bolt 172 between the bars 80a of link 80. By setting up on those bolts the outer races of the pairs of ball bearings 100a of pivot 88, of bearings 126 of pivot 120, and of bearings 156 of pivot 162, are forced toward each other, putting the bearings under pre-loading stress.

As will be seen particularly in Fig. 2, the axes of pivots 120 and 162 lie on a line L which extends through the center of stylus roller 104. The two triangles that have their apices, respectively, at 88, 120, 162 and at 94, 104, 162 are consequently similar, and pivot 162 consequently follows the two-dimensional movements of stylus 104 at a scale that is determined by the relative spacings of the several pivots that define the triangle apices. Upper slider 72, mounted for free and substantially frictionless movement on its compound ball bearing mounting, partakes accurately of the two-dimensional movement of pivot 162. And a tool, such as indicated at 180, rigidly mounted on the upper slider also partakes accurately of that movement.

The tool may be of any desired character suited to the work involved and may be rigidly mounted on the upper slider in such a tool holder as shown at 182. The holder may involve adjustments, for tool height and angle, of any suitable or known kind. The ratio of the stylus radius to that of the cutting edge of the tool should be the same as the reduction ratio for which the pantograph is set. That ratio, as shown here, is ten to one.

The arrangement as so far described is one in which the work is carried and rotated by the head-stock of a lathe or similar machine tool, while the tool is carried by the ball bearing supported slider combination that, with the pantograph, is carried on the lathe cross-slide. The general manner of operation is thus like that in which a lathe is usually operated; that is, the work is rotated and the tool carried on the cross-slide.

On the other hand, as for example in the operation of a milling machine or grinder, the tool may be carried and rotated by a head-stock spindle or equivalent, and the work carried on the cross-slide and moved relative to that slide by the pantograph, also mounted on the cross-slide. Fig. 8 illustrates such an arrangement.

In that figure, for simplicity of illustration, the same simple lathe structure as in Fig. 1 is shown. With the exceptions to be described, the parts shown in Fig. 8 are the same as in Fig. 1 and are given the same designating numerals. However, here, for illustration the spindle of the head-stock or equivalent is shown as carrying the tool, as in a milling machine, grinder, or the like. For illustrative purposes an end mill 200 is shown in the chuck 15. A work piece 202 is shown rigidly held in an illustrative clamp 104 that is rigidly mounted on the upper slider 72. The mill is shown, illustratively, as milling a slot 106 in the work piece; the shape or contour of the slot bottom being controlled by the contour of the template 58.

The operation in either of the described arrangements, or in any similar arrangement, is the same. The whole pantograph mounting is first oriented and set in the general plane in which the work is to be done, by setting the back-up plate on the cross-slide. Then, with the stylus at a determined beginning point on the template, the tool and work are accurately set in proper relation to each other by moving and setting the carriage and cross-slide. The work is then done with extreme accuracy merely by moving the stylus along the template. The whole mechanism is subjected to a minimum of distortional stress. Seeing that all the relative movements in the mechanism are substantially frictionless, the only stresses imposed upon it are those due to feeding the tool and/or work piece; and those stresses can be reduced to a minimum by suitable tool shaping, etc. Thus, the whole pantograph mechanism operates without any substantial distortion; and also without any loosenesses or backlash, due to the fact that the bearings at all points of relative movement can be tight or preloaded. This all results in the manual operation being very easy, and in extreme accuracy of the finished product.

We claim:

1. Mechanism for performing pantograph-guided work on a work-piece element with a tool element; said mechanism comprising the combination of a lathe which comprises a rotatable spindle adapted to carry one of said elements, a lathe bed extending parallel to the spindle axis, a carriage movable longitudinally of the lathe bed and a cross-slide mounted on the carriage and movable transversely of the lathe bed; a support member mounted on the cross-slide and movable therewith, the support member being rotatably adjustable with respect to the cross-slide about an axis that is perpendicular to the directions of movement of the carriage and of the cross-slide; and pantograph mechanism mounted entirely on said support member and movable bodily therewith, said pantograph mechanism comprising a double slide adapted to carry the other element and mounted on the support member for two-dimensional movement parallel to the plane of movement of said support, a template carrier rigidly mounted on the support member, a linkage support rigidly mounted on the support member, and a pantograph linkage pivotally mounted on the linkage support, said pantograph linkage including a template-following stylus and being operatively connected to the double slide to drive its said movement; the work-piece element and the tool element being mutually movable into working relation by movement of the cross-slide without deflecting the pantograph linkage.

2. In a pantograph device, a plurality of pivotally interconnected pantograph links, at least one of said links involving two spaced bar members, the pivotal interconnection between said one link and an adjacent link involving radial ball bearings having their outer races rigidly set in the two spaced bar members, a central pivot member extending through the inner races of the ball bearings in close fit and through the adjacent link in close fit, means spacing apart the inner races of the ball bearings, and means for forcing the two link bars toward each other to put the ball bearings under preloading stress.

3. In a pantograph device, the combination of a plurality of pivotally interconnected pantograph links, two inter-pivoted ones of said links each involving two spaced bar members, interpivotal structure involving two radial ball bearings with their outer races set in the two bar members of one of said links, means connecting the inner races of the ball bearings rigidly to the two bar members of the other of said links, a supporting pivotal structure for the pantograph links involving two radial ball bearings with their outer races set in the two bar members of one of said links on an axis parallel to and spaced from the interpivotal axis, a supporting member and means rigidly connecting the inner races of the ball bearings to said supporting member, a member adapted to be moved by operation of the pantograph linkage, a pivotal connection between the other of said two links and said member, said pivotal connection involving two radial ball bearings with their outer races set in the two bar members of said other link on an axis parallel to and spaced from the interpivotal axis and means rigidly connecting the inner races of said ball bearings to said movable member, and means for pre-loading each of the three pivotal connections involving means for forcing the two bars of each of the two links toward each other at points between the inter-pivotal connection and the other pivotal connection and the supporting pivotal structure, respectively.

References Cited in the file of this patent

UNITED STATES PATENTS

| | | |
|---|---|---|
| 1,234,225 | Sickles | July 24, 1917 |
| 1,707,914 | Lampe | Apr. 2, 1929 |
| 2,253,095 | Rothweiler | Aug. 19, 1941 |
| 2,379,419 | Atti | July 3, 1945 |
| 2,434,834 | Civitarese | Jan. 20, 1948 |
| 2,689,505 | Ossenback | Sept. 21, 1954 |
| 2,766,529 | Dwyer | Oct. 16, 1956 |